Aug. 25, 1953

F. J. FONTEIN 2,649,963

APPARATUS FOR CONTINUOUSLY SEPARATING SOLIDS
IN OR FROM LIQUID SUSPENSIONS THEREOF

Filed Feb. 4, 1949

Inventor
Freerk J. Fontein
By Cushman, Darby & Cushman
Attorneys

Aug. 25, 1953  F. J. FONTEIN  2,649,963
APPARATUS FOR CONTINUOUSLY SEPARATING SOLIDS
IN OR FROM LIQUID SUSPENSIONS THEREOF
Filed Feb. 4, 1949  4 Sheets-Sheet 2
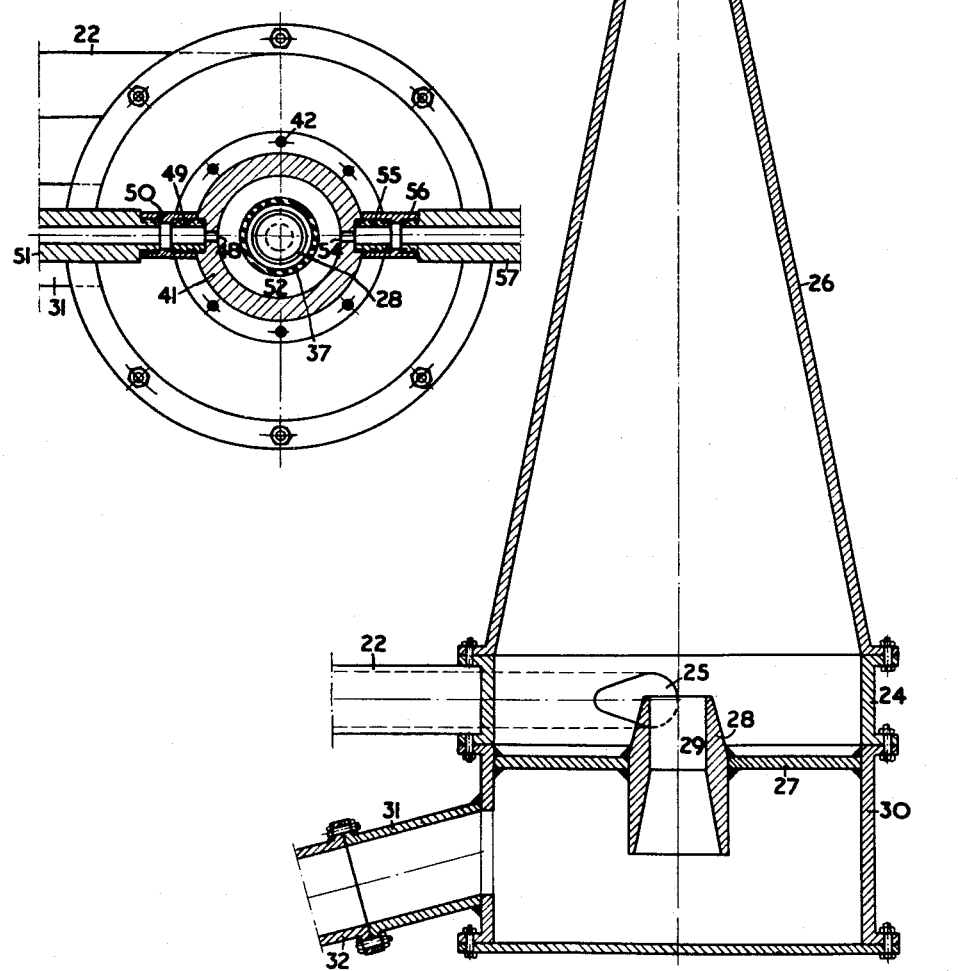
Freerk J. Fontein Inventor
By Cushman, Darby & Cushman
Attorneys Aug. 25, 1953  F. J. FONTEIN  2,649,963
APPARATUS FOR CONTINUOUSLY SEPARATING SOLIDS
IN OR FROM LIQUID SUSPENSIONS THEREOF
Filed Feb. 4, 1949  4 Sheets-Sheet 3

Inventor
Freerk J. Fontein
By Cushman, Darby & Cushman
Attorneys

Aug. 25, 1953

F. J. FONTEIN 2,649,963

APPARATUS FOR CONTINUOUSLY SEPARATING SOLIDS
IN OR FROM LIQUID SUSPENSIONS THEREOF

Filed Feb. 4, 1949

Inventor

Freerk J. Fontein

By Cushman, Darby & Cushman
Attorneys

Patented Aug. 25, 1953

2,649,963

UNITED STATES PATENT OFFICE 2,649,963

APPARATUS FOR CONTINUOUSLY SEPA-
RATING SOLIDS IN OR FROM LIQUID
SUSPENSIONS THEREOF

Freerk J. Fontein, Heerlen, Netherlands, assignor
to Stamicarbon N. V., Heerlen, Netherlands Application February 4, 1949, Serial No. 74,644
In the Netherlands February 16, 1948

4 Claims. (Cl. 209—211)

The invention relates to novel and useful apparatus for continuously thickening or concentrating slurries of finely divided solids in liquid media and for continuously fractionating such solids in liquid suspensions thereof.

More specifically the invention relates to vortical separators of the kind comprising a separating chamber of conical or substantially conical shape, provided at or near its widest part with a tangential inlet for the suspension to be supplied under pressure therethrough and as a result of which the liquid body in the tank is compelled to rapidly rotate around the axis of the tank, the tank furthermore being provided with a central aperture in its base end closure member for continuously discharging the greater part of the liquid rotating in the tank and a second central aperture at its apex for continuously discharging the minor part of said liquid together with the particles separated from the suspension introduced into the tank.

The rotational movement in the tank is of the "return-flow" type, consisting of two concentrical vortices of the same rotational but of opposite axial directions, the outer one rotating towards the apex of the tank, the inner one rotating towards its base end. The major part of the liquid rotating in the outer vortex flows towards the axis of the tank into the inner vortex, the other part discharging through the apex aperture.

This particular type of apparatus is usually referred to as "cyclone" or "cyclonic separator." Such apparatus may be entirely of conical shape, but for reasons of constructional simplicity it mostly comprises a relatively short cylindrical portion, tapering into a relatively long conical portion.

In such apparatus the denser and greater particles of a suspension of solids in a liquid medium introduced tangentially are thrown towards the circumference of the tank by the centrifugal force caused by the rotational movement, whereas the smaller ones are dragged along with the liquid into the center of the rotating liquid body and discharged therefrom through the base aperture. It may be pointed out here that the broad end side of the apparatus, near the tangential inlet may be called base, not only because it can be considered as the base of a cone, but moreover as the rotational movement has its base at this side, the infeed of the liquid starting it along this side. Correspondingly the other side may be related to as the top side.

Various separation processes may be performed in the apparatus described hereabove. It can be used not only for dividing a mixture of particles suspended in a liquid medium into two fractions, one of which containing the coarser and/or the denser particles and the other containing the finer and/or lighter particles, but also to separate solids from liquid suspension in order to recover said solids or to clean the liquid medium or to obtain said suspension in a more concentrated condition. Moreover mixtures of particles of different grain size and different specific gravity can be separated according to specific gravity in such apparatus by feeding the mixture in a liquid suspension medium together with a certain amount of very fine particles of a specific gravity higher than the specific gravity of separation or in a liquid suspension medium of intermediate specific gravity as is more fully described and explained in an article by Driessen, called "The use of centrifugal force for cleaning fine coal in heavy liquids and suspensions with special reference to the cyclone washer," published in the Journal of the Institute of Fuel, vol. XIX, No. 105, December 1945, pages 33 to 44.

The control of the operation of the apparatus referred to hereabove obviously is of great importance to enable a change in the concentration or composition of the fractions of the suspension introduced into the separator, obtained during such operation, and to maintain the concentration and composition of the fraction which discharges from the apex aperture of said apparatus at the desired concentration value and composition in case of inconstant condition of the infeed.

It is therefore an object of the invention to provide apparatus of the kind referred to with means for continuously controlling the concentration and composition of the said fractions discharging from said apparatus.

Moreover it is an object of the invention to provide for such control means which enable a gradual change of the conditions of the discharge. It may be pointed out that the limitation as to the said gradual change excludes all control means which work only stepwise resulting in sudden changes in the discharge. Only with such a gradual change being possible, any variation in the discharge can be prevented or at least immediately corrected.

It is still another object of the invention to provide for apparatus of the kind set forth from which a fraction of the infeed of invariable concentration may be obtained independent of fluctuations of the infeed condition. Other objects will become apparent in the following description of the invention.

According to the invention the apparatus for continuously separating solids in or from liquid suspensions thereof comprises a separating device as set forth characterized by annular control means on one or each of the discharges for varying the cross-sectional area of one or each of said discharges in response to fluid pressure exerted on those means including a resilient member encircling the discharge.

In varying the cross-sectional area of the discharge of said apparatus not only the amount of material discharged through said area will be changed corresponding to the increase or decrease of said cross-sectional area but also the concentration, and when particles of a different chemical nature are included in the mixture to be separated the composition of the discharged suspension will be altered correspondingly. When decreasing the cross-sectional area of the apex discharge aperture the concentration of said discharge will rise and also its content of denser particles. The same is due when increasing the cross-sectional area of the base discharge aperture. Nevertheless the former way of control is preferred as in this way the capacity of the separator will not be effected by the control, whereas the said capacity appears to be dependable on the cross-sectional area of the base discharge aperture.

The said resilient member in its simplest form may be constructed as a hollow rubber annulus in a stiff casing preventing its expansion to all sides except to the center of the annulus and operatable as an iris diaphragm by adequate fluid pressure control. Instead of such an annulus-shaped member a rubber cylinder may be fastened with its upper and lower rim to the inner surface of a cylinder of non-resilient material, provided with a supply for fluid pressure to bulge the rubber part of the device. The devices present to the discharge an opening having convex side walls when appropriate fluid pressure is admitted, the side walls in this way not obstructing the discharge in any sudden or vortex-disturbing manner.

According to another mode of design the resilient annulus may be constituted by a thick rubber disc provided with a central opening, which disc in order to obtain a proper discharge opening may be compressed in an axial direction e. g. between two metal plates. This disc can be easily manufactured and moreover the central opening can be shaped in such a way that it forms a continuation of the inner wall of the cyclone from where it proceeds continuously and preferably hyperbolically. When the rubber disc is compressed the hyperbolical shape of the central opening is maintained. Due to this special design no sudden changes of direction or disturbances of flow occur in the outflowing rotating suspension.

In order to prevent the rubber disc from bulging outwards it has either to be locked in a casing or to be provided with a reinforcement on the circumference. For this purpose split collars or spiral springs may be clamped round the disc and vulcanized into it.

It has been found however that still another design of the resilient annulus is to be preferred as the most reproducible results will be obtained when using this type. This preferred resilient member consists of a collar, that presents at all time to the discharge an opening having convex side walls and which collar is U-shaped in cross-section when in unstressed condition. This collar is locked up between a closure member for the open annulus of the U and corresponding compressing devices in such a way that part of the flanges of the collar are free from being compressed between said devices and the said closure member. The latter is provided with a connection for fluid pressure supply to a pressure-receiving space formed between the U and the closure member.

Soft rubber has proved to be the most suited material the wear of which can be neglected.

A cyclone provided with similar annular control means and a control vessel with a pressure regulator sensitive to specific gravity, will immediately respond to any change of the outflowing suspension, so that this change will be counterbalanced. As a result of this the specific gravity of the thickened suspension is kept at a constant value.

Devices have heretofore been employed or suggested consisting of separating apparatus of some kind provided at some discharge with annular control means for varying the cross-sectional area of said discharge. None of these apparatus however is apt to perform the special kind of control which is an object of the invention as set out heretofore. On the contrary the annular control means used in these prior devices or suggestions serve the purpose of controlling the amount of discharging materials only, without having any influence on the conditions thereof.

The continuous control of the concentration for instance is of importance for application in the preparation and reconditioning of heavy medium sink-and-float separation media. This sink-and-float process may be applied for separating coal or ore from admixed impurities. For this purpose the mixture to be treated is fed into a suspension of some weighting material, such as slimes of shale, magnetite, galenite and the like, said suspension having a specific gravity intermediate between the specific gravities of the solids to be separated. The specifically light particles float on the surface of the suspension whereas the specifically heavy particles sink. From the suspension bath the separated fractions are supplied to screens on which the entrained suspension material is removed by spraying. The resultant losses of suspension medium in the bath will have to be made up. For this purpose the diluted suspension passed through the screens is subjected to a thickening process. The suspension has to be adjusted to the proper specific gravity before being reversed to the bath; as it will be clear that, for instance in the case of a coal washery, modifications of the specific gravity of the bath might cause either the ash content of the coal fraction or the coal content of the shale fraction to increase and which must be prevented.

Moreover fresh suspension medium must be made up in order to compensate for other inevitable losses of suspension medium. Also this fresh suspension medium must be adjusted to the proper specific gravity.

The invention will be further described and explained with application to such a sink-and-float process for purposes of better understanding of its essential features only and not for limitating the use of the apparatus according to the invention to such process, as it will be clear that various changes as to the construction, the operation and the application of said apparatus may be made without departing from the general principles and scope of the invention.

In the accompanying drawings:

Figure 2 is an axial section of a cyclone which appears in Figure 1.

Figure 3 is a cross-section on the line III—III in Figure 2.

Figure 1:
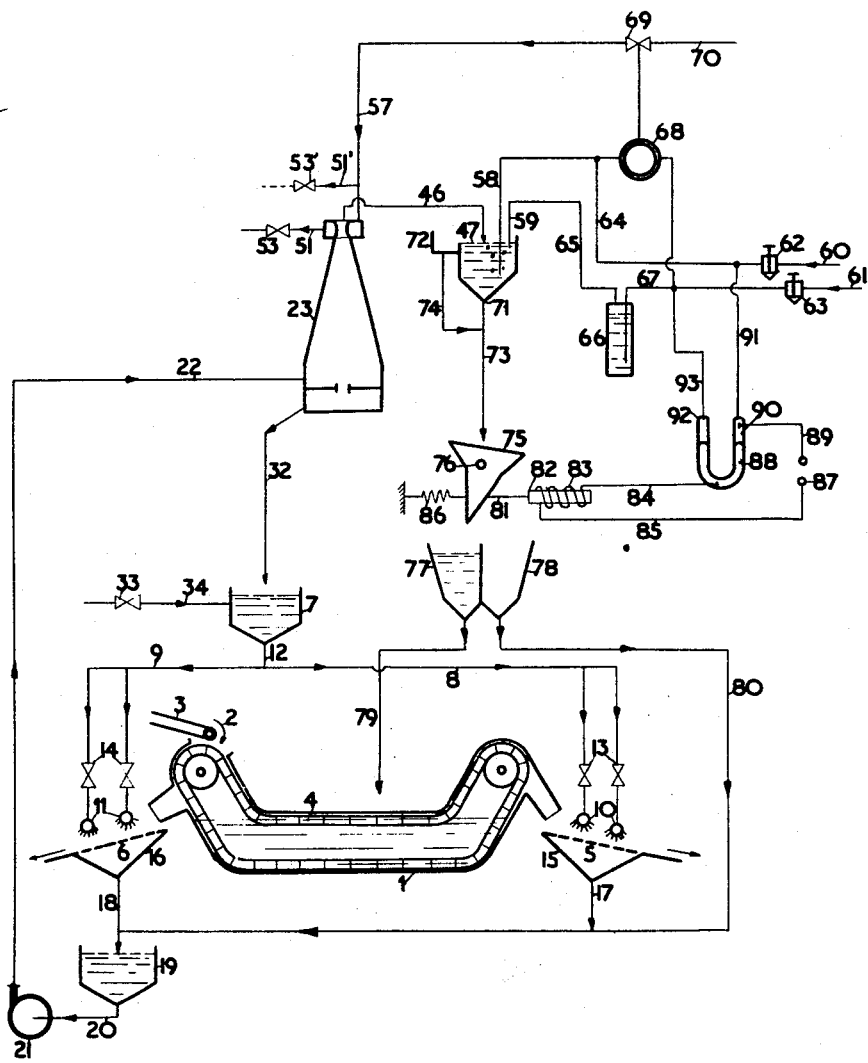
Figure 1 is a diagram showing an installation in accordance with the invention.

Referring to Figure 1, reference numeral 1 designates a washingbox of the sink-and-float type of known design. The washingbox is filled with a suspension of a specific gravity intermediate the specific gravities of the particles to be separated, for instance coal and shale. This material is supplied to the washingbox at 2 by a belt 3. The floating particles are removed by the upper part of an endless scraper chain 4 and discharged on to a screen 5, whereas the sunken particles are discharged on to a screen 6. The adhering suspension particles are removed from the separated products by spraying water, which is supplied from a tank 7, through pipes 8 and 9 to spray heads 10 and 11. The pipes 8 and 9 are branched from the outlet pipe 12 of the tank 7 and provided with regulating valves 13 and 14.

The through-fall of the screens collects as a diluted suspension of fine particles in water, in tanks 15 and 16 from which it flows through pipes 17 and 18 to a receiver 19, which is provided with an outlet pipe 20 connected with the inlet of a pump 21 through pipe 22 under pressure to the tangential inlet of a cyclone 23, which for simplicity's sake is shown only diagrammatically in Figure 1. This cyclone is shown in an inverted position in contradistinction with the normal position of these separators. The position shown has no special significance with relation to the features of the invention but has been chosen for reasons of plant construction design as it enables a smaller height of construction. Every other position will do as well in obtaining the invention's objects.

As shown in Figure 2 this cyclone comprises a relatively short cylindrical portion 24 provided with an inlet opening 25 for the suspension to be treated and a relatively long conical portion 26. An end closure member 27 forms the base of the separator and is provided with a vortex finder 28 having a central opening 29 for discharging the clarified liquid medium into an outlet hood 30. This hood is not at all essential for the separating action of the cyclone but merely provides for a receiving chamber which can be dispensed with. The outlet hood is provided with a junction tube 31 which is flanged to a pipe 32. The clarified water is led through this pipe to the tank 7 for the supply of the rinsing water for the spray heads 10 and 11. If necessary fresh water can be supplied to this tank through valve 33 and pipe 34.

The conical portion has an apex aperture 35 coaxial with the opening 29 and is provided at the top with a welded flange 36. A resilient U-shaped collar 37 encircling the apex aperture is clamped with the rims of its upper and lower flanges 38 and 39 between the flanges 36 and 40 and a surrounding supporting ring 41 by means of bolts 42, in such a way that the more central parts of the flanges are free to expand in a radical inward way. The flange 40 forms a part of a junction pipe 43 to which a receiving chamber 44 is attached by means of bolts 45. Flanged to this chamber is a pipe 46 which leads the thickened suspension to receiver 47.

The ring 41 is provided with a bore 48 in which a hollow plug 49 is threaded. A socket 50 connects the plug with a pipe 51 to communicate the space 52 inside the collar via a throttle valve 53 with the atmosphere. A second bore 54 is provided in the ring in which a plug 55 is secured to which by means of a socket 56 an air supply pipe 57 is connected. It is also possible to branch the leakage pipe from the air supply pipe as indicated at 51¹ in Figure 1 with a dotted line and to provide this pipe with a throttle valve 53¹. In such case, only pressure supply pipe 57 opens to the space 52 inside the collar 37.

Reference numerals 58 and 59 designate bubble-tubes having open ends terminating in vertically spaced relation in receiver 47, tube 59 terminating adjacent the top and tube 58 at a lower elevation. Compressed air is supplied through pipes 60 and 61 and reduction valves 62 and 63 to the tubes 58 and 59. Tube 58 is connected by a pipe 64 with the reduction valve 62, whereas the bubble-tube 59 communicates through a pipe 65 with the upper end of a closed vessel 66. This vessel is partly filled with a liquid, for instance oil. A pipe 67 leads from the reduction valve 63 to a point below the level of the liquid in vessel 66.

A pressure sensitive instrument 68 which is connected at one side with pipe 64 and at the other side with pipe 67 controls the valve 69 in order to adjust the pressure of the compressed air supplied by a pipe 70. The reducing valve is connected through pipe 57 with the space 52 inside the resilient collar. The pressure sensitive instrument may be of any well known design for instance a Foxboro Bell Type Meter and preferably a Stabilog density-controller Model M40.

The air delivered to the bubble-tubes 58 and 59 will encounter different pressure-resistances in receiver 47 due to the vertical spacing of their ends. The pressure difference between the pipes 64 and 65 is correlated to the depth of immersion of pipe 67 in the liquid in vessel 66. By a suitable choice of the density of this liquid and of the depth of immersion of pipe 67 the pressure difference between pipe 64 and pipe 67 may be reduced to zero when the suspension in receiver 47 has the required specific gravity. The object of the pressure-resistance 66 is to enable the use of a pressure sensitive instrument 68 more sensitive to small pressure variations.

Variations of the density of the thickened suspension from the desired density are corrected by varying the size of the apex aperture. When the density in the receiver 47 falls below a desired density value the pressure in pipe 64 correspondingly decreases with respect to the pressure in pipe 67 resulting in valve 69 being controlled by pressure sensitive instrument 68 in such a way, that the pressure in pipe 57 increases. This effects an increase in pressure in the space 52 inside the collar whereby the discharge aperture 35 of the separator decreases as indicated in dotted lines in the Figures 2 and 3 and a higher concentrated suspension will be discharged.

As will be understood the shape of the discharge opening remains circular so that in contrast to other flow restricting devices the vortical flow of the separator will not be disturbed.

When the density in receiver 47 increases beyond the desired density the pressure in pipe 64 will rise, with respect to the pressure in pipe 67 with the result, that the reduction valve 69 is controlled in such a way by the pressure sensitive instrument 68, that the pressure in pipe 57 decreases. As the air can leak out through the throttle valve 53 also the pressure in the space 52 decreases so that the apex opening will become larger and the density of the thickened suspension diminishes.

In feeding the separator with water the resilient collar 37 obviously should close in order to prevent the water to enter the washingbox. Also when feeding a very diluted suspension this collar should only permit the correspondingly quite small amount of thickened suspension to discharge. This is an unattractive situation in controlling annular resilient control means. Therefore the installation as shown provides for a preferred solution of this problem, viz. returning the discharge of the separator to that separator when the density of the said discharge decreases below a predetermined density value.

The receiver has a bottom outlet 71 whose capacity is insufficient to pass the discharge from the separator device and is provided with an overflow 72 for discharging the surplus. In this way a constant level is maintained in the receiver 47. So it is also possible to use only one bubbletube 58 and to communicate the low pressure side of the pressure sensitive instrument with the atmosphere.

The suspension discharged from the bottom outlet of the receiver 47 and from its overflow is sent through pipes 73 and 74 to a flow-directing member 75 which is in the form of a funnel and is adapted to pivot on a horizontal axis 76. Below the funnel is a pair of receptacles 77 and 78 of which the former discharges through a pipe 79 to the washingbox while the latter discharges to the tank 19 through a pipe 80.

Attached to the member 75 is a rod 81 which is provided at its end with a core 82 of a normally non-energized coil 83. The coil is connected with two conductors 84 and 85.

With the parts positioned as shown, the member 75 is held by the action of a spring 86 for discharge into receptacle 77. If coil 83 is energized by a source of electrical power 87, the core 81 is pulled inside the coil with the result that the funnel 75 shifts to bring its spout over the receptacle 78.

A pressure responsive contactor 88 is adapted to close the circuit which energizes the coil 83. This contactor is of the mercury type and comprises a U-shaped tube partly filled with mercury. The contactor 84 ends at the lower end of the U-tube, whereas a contactor 89, which is connected with its end to one pole of the source of electrical power ends above the level of the mercury in the leg 90 of the U-tube. This leg is connected at the top by means of a pipe 91 to pipe 64 and the other leg 92 is connected at the top by means of a pipe 93 to pipe 67. The end of contactor 88 is connected to the other pole of the source of electrical power.

When the density of the suspension in receiver 47 increases to a predetermined density value, the connection between the conductors 84 and 85 will be interrupted and member 75 will be shifted to a delivering relation to receptacle 77 so that the suitable thickened suspension will be supplied to the washingbox. However should the density of the suspension in receiver 47 fall below the predetermined density the pressure in the space above the level of the mercury in the leg 92 of the contactor will become higher as the air pressure in the leg 90 with the result that the mercury will raise in this leg and finally reach the end of contactor 89. At this moment the coil 83 will be energized so that the core 82 is pulled inwards the coil and the member 75 is brought in delivering relation to receptacle 78. The suspension will now be delivered to the tank 19 and is returned to the cyclone.

Correspondingly the resilient collar 37 only will have to adjust the density of the discharge down to the predetermined density value and so the pressure operated valve can be made much more responsive to small densities.

Figure 4:
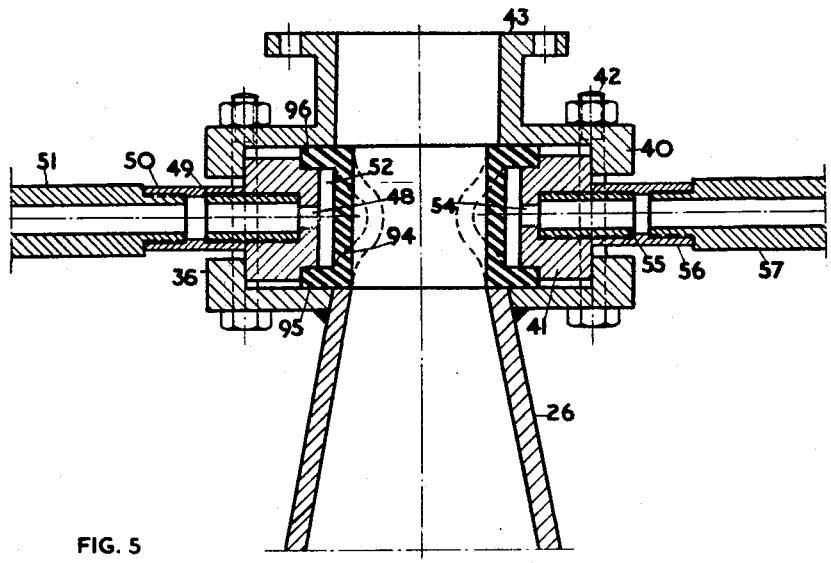
Figure 4 is a modified detail of a cyclone apex in axial section.

In Figure 4 is shown the apex portion of the cyclone in which the annular resilient member encircling the apex opening consists of a substantially cylindrical member having a cylindrical main portion 94 and outwardly flanged borders 95 and 96 which are clamped between the flange 36 of the conical portion 26 of the cyclone, flange 40 of the junction pipe 43 and the ring 41 by means of bolts 42.

Compressed air is delivered to the annular space 52 between the resilient member and the ring through a bore 54 by means of pipe 57 which is connected to the ring by a plug 55 and a socket 56. When the pressure of the compressed air increases the cylindrical portion 94 will be bulged inwardly and the shape of the diaphragm will be as indicated in dotted lines in Figure 4 whereby the discharge aperture maintains its circular cross-section. The air can leak out of the space 52 through a bore 48 and a pipe 51 which is connected to the ring 41 by means of a plug 49 and a socket 50 and provided with a throttle valve 53. When the pressure of the compressed air decreases the pressure in the space 52 decreases too due to the leakage of the air through the throttle valve and the cross-sectional area of the discharge opening in the resilient member will be enlarged.

Figure 5:
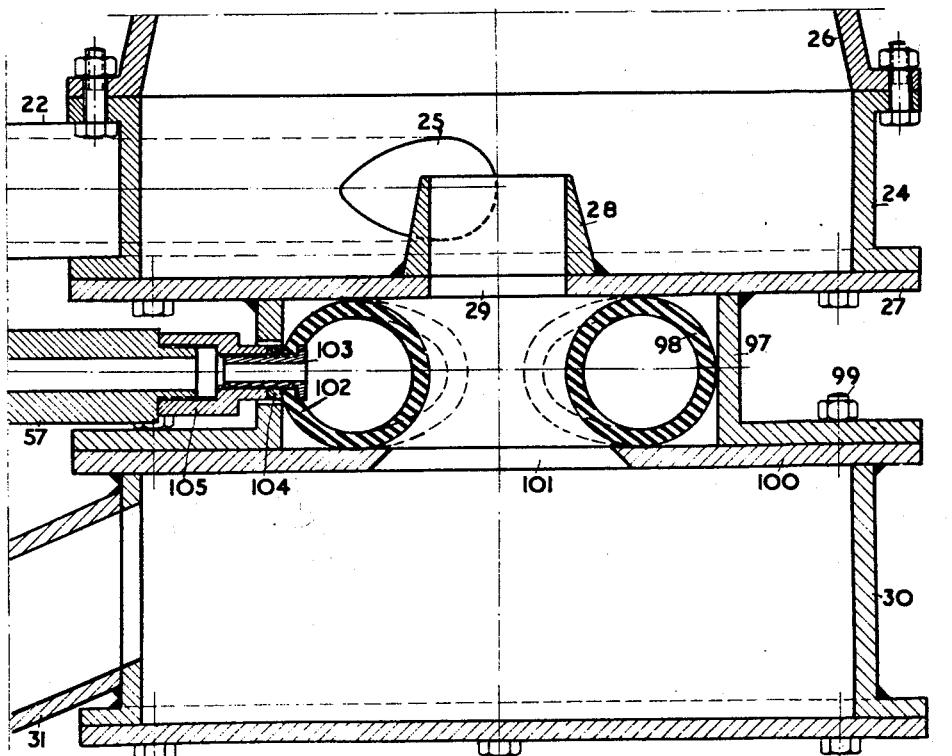
Figure 5 is an axial section of the base end of a cyclone with annular control means of the outlet aperture and Figure 6 shows another modification in axial section of the apex portion of a cyclone.

It is also possible to regulate the density of the thickened suspension discharged through the apex opening by providing the outlet opening 29 in the base end of the cyclone with a resilient collar as is shown in Figure 5 of the drawings.

In this example a control chamber 97 is welded on the plate 27 which closes the cylindrical inlet chamber 24 of the cyclone. The axis of the control chamber is in central alignment with the axis of the outlet opening 29 in the vortex finder 28. A rubber torus 98 is centrally disposed in the control chamber so that the expansion in a direction radially outwards is prevented. The outlet chamber 30 is fixed by means of bolts 99 to the control chamber so that the torus is locked up in axial direction between the base plate 27 and the plate 100. This plate is provided with a central aperture 101 of a greater cross-section than the outlet aperture of the closure member and diverges in the direction of the outflow. The torus is provided with an aperture 102 in which a flanged tube 103 is airtight inserted with the aid of a threaded ring 104. The air supply pipe 57 is fixed to this tube by means of a socket 105. Branched from pipe 57 is a pipe 51$^1$ which is provided with a throttle valve 53$^1$ as indicated in dotted lines in Figure 1.

When the pressure of the compressed air supplied by the pipe 57 increases the torus will deform in the way as shown by the dotted lines in Figure 5. The decrease of the cross-sectional area of the discharge opening causes the concentration of the thickened fraction to decrease whereas the concentration of this fraction increases as the said cross-sectional area increases. For this reason the reduction valve 69 in the air supply pipe 57 is controlled in such a way by the pressure responsive instrument 68 that an increase of the pressure difference between the pipes 64 and 67, indicating a higher density of the thickened fraction, results in an increase of pressure in pipe 57 whereas a decrease of the pressure difference between the pipes 64 and 67 results in a decrease of pressure of the compressed air in pipe 57.

Figure 6:
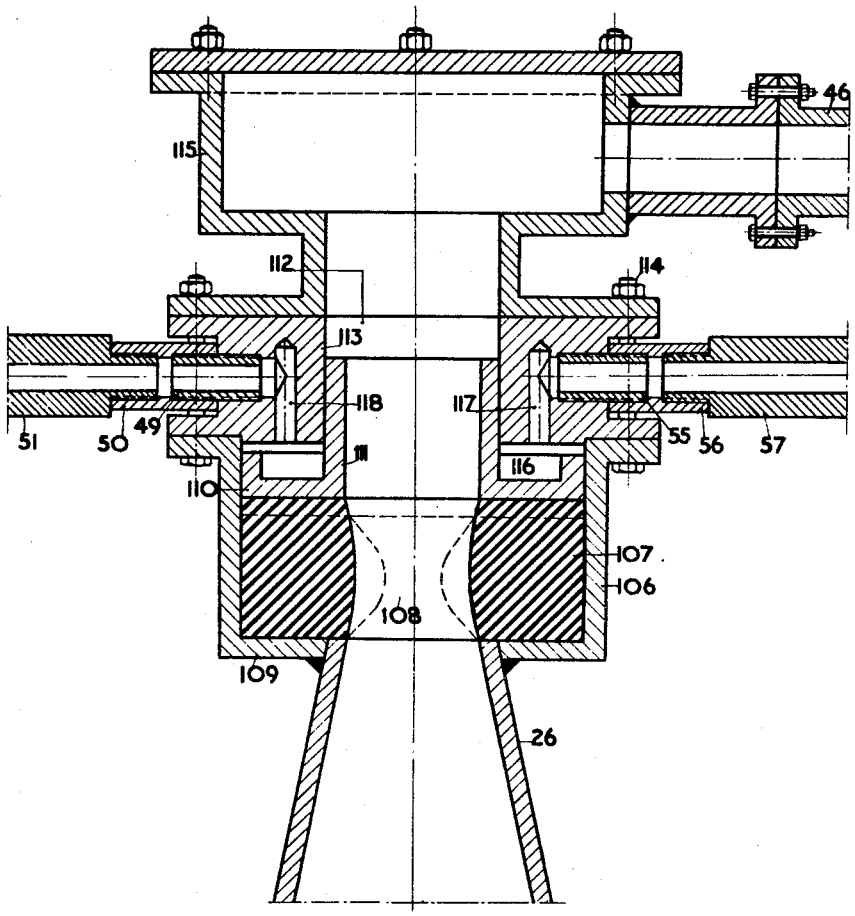

In the example represented in Figure 6 a cylindrical casing 106 is welded to the conical portion 26 of the cyclone, which casing surrounds a thick rubber disc 107 so as to prevent the disc to expand outwards when being compressed. The disc is provided with a central aperture 108 of hyperbolic axial cross-section and is in alignment with and continuous with the tapering inner wall of the separating chamber. In axial direction the disc is locked up between the bottom plate 109 of the housing and an annular piston 110. This piston is at its periphery guided in the inner cylindrical wall of the casing 106 and is provided with a cylindrical extension 111 which is guided in a central opening 112 of a pressure supply head 113.

The pressure supply head is clamped by means of bolts 114 between the casing 106 and an outlet chamber 115 for the thickened fraction.

Compressed air is admitted in the annular space 116 through bore 117 in the pressure supply head to which the air supply pipe 57 is connected by means of a plug 55 and a socket 56. The space 116 is on the other hand connected via a bore 118, leakage pipe 51 and throttle valve 53 with the atmosphere. Pipe 53 is fitted to the pressure supply head by means of plug 49 and socket 50.

When the density of the discharged thickened suspension becomes too low the pressure of the compressed air supplied by pipe 57 increase in the way as already described in relation with Figure 2. This causes an increase in pressure in the space 116. Due to this pressure the piston 110, which may be vulcanized on to the rubber disc or may be not and slidable in the casing 106 compresses the rubber disc so that it deforms as indicated in dotted lines in Figure 6. This causes a decrease of the cross-sectional area of the discharge opening 108 with the result that the concentration of the thickened discharge increases. When the density of the thickened suspension becomes too high the pressure of the supplied compressed air decreases correspondingly and due to the leakage of air through the bore 118 and the throttle valve 53 the pressure in the space 116 decreases also so that the force that is exerted by the pressing piece in the rubber disc diminishes and the diameter of the circular opening 108 in the disc increases.

It will be understood that variations from the described process and apparatus are possible without departure from the invention as defined in the following claims.

I claim:

1. Apparatus for continuously separating solids in and from a liquid suspension thereof, comprising a circular tank including at least one end wall, the tank being provided with a tangentially disposed inlet aperture positioned adjacent said end wall, said end wall being provided with a centrally positioned circular discharge aperture, the opposite end portion of the tank being provided with a second circular discharge aperture in axial alignment with the first mentioned discharge aperture, a resilient annular member positioned at the second discharge aperture so that the inner periphery of said member will define the circular bounding wall of the second discharge aperture of said tank, a reservoir to receive the discharge from the last mentioned aperture, said reservoir including a bottom outlet of insufficient capacity to pass the material discharged therein from said circular tank and said reservoir also including an overflow, a receptacle positioned below the bottom outlet of said reservoir, a pair of receiving tanks positioned below said receptacle, means connecting one of said receiving tanks to a point of use of the suspension, means for connecting the other of said receiving tanks to the inlet of said circular tank, and means responsive to the density of the material in said reservoir to selectively connect the bottom outlet of said reservoir and one of said receiving tanks and to contract the inner periphery of said annular member.

2. Apparatus of the character described in claim 1 wherein said means responsive to the density of the material in said reservoir includes pipes opening to different elevations in said reservoir, means to supply pressure to said pipes, and means responsive to the pressure differential in said pipes.

3. Apparatus of the character described in claim 2 including a pressure resistance means positioned between the pipe opening to the highest elevation in said reservoir and said means to supply pressure to said pipes.

4. Apparatus of the character described in claim 2 wherein said means to supply pressure to said pipes includes pressure adjusting valves.

FREERK J. FONTEIN.

References Cited in the file of this patent

UNITED STATES PATENTS

| Number | Name | Date |
|---|---|---|
| 950,208 | Ledaux | Feb. 22, 1910 |
| 1,177,849 | Kalb | Apr. 4, 1916 |
| 1,293,027 | Burton | Feb. 4, 1919 |
| 1,494,906 | Haynes | May 20, 1924 |
| 1,599,163 | Buchanan | Sept. 7, 1926 |
| 1,605,171 | Chance | Nov. 2, 1926 |
| 1,895,505 | Wuensch | Jan. 31, 1933 |
| 1,995,559 | Andrews | Mar. 26, 1935 |
| 2,008,643 | Lockett | July 16, 1935 |
| 2,206,981 | Sturtevant | July 9, 1940 |
| 2,286,987 | Sturtevant | June 16, 1942 |
| 2,320,519 | Hirst | June 1, 1943 |
| 2,377,524 | Sampson | June 5, 1945 |
| 2,377,721 | Scott | June 5, 1945 |

FOREIGN PATENTS

| Number | Country | Date |
|---|---|---|
| 608,026 | Great Britain | Sept. 8, 1948 |

OTHER REFERENCES

Driessen: Cleaning of Coal by Heavy Liquids, Institute of Fuels, August 1939 pages 335, 336, 340.